United States Patent
Li et al.

(10) Patent No.: US 11,825,343 B2
(45) Date of Patent: *Nov. 21, 2023

(54) SYSTEMS AND METHODS FOR PACING DATA TRANSMISSION FOR A WIRELESS NETWORK

(71) Applicant: Verizon Patent and Licensing Inc., Basking Ridge, NJ (US)

(72) Inventors: Feng Li, Lexington, MA (US); Haim S. Ner, Fair Lawn, NJ (US); Bjorn Olof Erland Kalderen, South Orange, NJ (US); Ning Chen, Harvard, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/693,884

(22) Filed: Mar. 14, 2022

(65) Prior Publication Data

US 2022/0201551 A1 Jun. 23, 2022

Related U.S. Application Data

(63) Continuation of application No. 16/990,685, filed on Aug. 11, 2020, now Pat. No. 11,304,095.

(51) Int. Cl.
*H04W 28/06* (2009.01)
*H04W 28/02* (2009.01)

(52) U.S. Cl.
CPC ....... *H04W 28/06* (2013.01); *H04W 28/0231* (2013.01)

(58) Field of Classification Search
CPC ............ H04W 28/06; H04W 28/0231; H04W 28/0236; H04W 28/0289; H04W 28/22; H04W 8/04; H04L 47/10; H04L 47/20; H04L 47/36; H04L 47/365; H04L 47/215; H04L 47/2416; H04L 47/2425

See application file for complete search history.

(56) References Cited

U.S. PATENT DOCUMENTS

| | | | |
|---|---|---|---|
| 2004/0008625 A1* | 1/2004 | Lee | H04L 47/215 370/395.7 |
| 2005/0174944 A1 | 8/2005 | Legault et al. | |
| 2007/0076621 A1* | 4/2007 | Malhotra | H04L 47/22 709/224 |
| 2007/0147422 A1 | 6/2007 | Urano et al. | |
| 2008/0025214 A1* | 1/2008 | Bettink | H04L 47/2441 370/468 |
| 2009/0010165 A1 | 1/2009 | Kim et al. | |
| 2009/0196175 A1 | 8/2009 | Sammour et al. | |
| 2009/0296582 A1* | 12/2009 | Shi | H04L 47/39 370/236 |
| 2012/0096130 A1 | 4/2012 | Wei et al. | |
| 2013/0311667 A1 | 11/2013 | Payette | |
| 2015/0023168 A1 | 1/2015 | Kotecha et al. | |
| 2021/0058328 A1* | 2/2021 | Xu | H04L 41/0803 |

* cited by examiner

*Primary Examiner* — Kan Yuen

(57) ABSTRACT

Systems and methods for pacing data transmission are described. An illustrative method includes transmitting, by a network device, a data stream at a pacing rate to a user equipment (UE) device. The method further includes accessing a metric of a radio access network (RAN) to which the UE device is connected, the metric associated with the UE device. The method further includes adjusting, based on the metric, the pacing rate at which the data stream is transmitted to the UE device.

20 Claims, 7 Drawing Sheets

SYSTEMS AND METHODS FOR PACING DATA TRANSMISSION FOR A WIRELESS NETWORK

RELATED APPLICATIONS

This application is a continuation application of U.S. patent application Ser. No. 16/990,685, filed Aug. 11, 2020, and entitled "Systems and Methods for Pacing Data Transmission for a Wireless Network," which is hereby incorporated by reference in its entirety.

BACKGROUND INFORMATION

Wireless communication networks, such as 4G (fourth generation) and 5G (fifth generation) networks, allow user equipment (UE) devices to wirelessly connect to the networks and access information, services, applications, etc. provided over the networks. It is desirable to improve the technologies used to implement wireless communication networks, including technologies to send data to UE devices over the networks.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Figure 1:
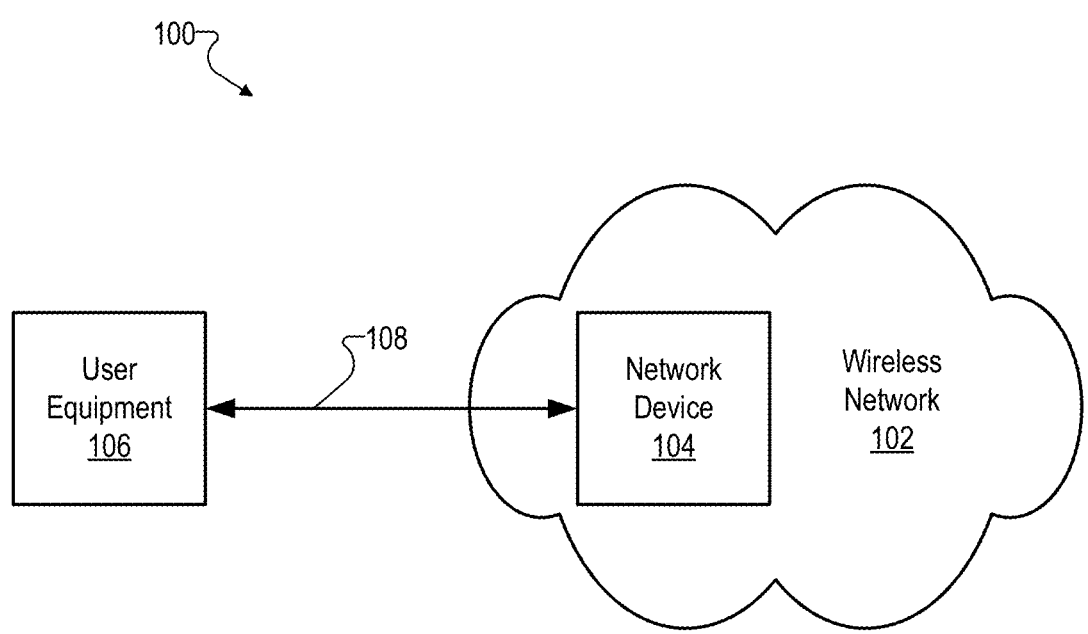
FIG. 1 depicts an illustrative network environment in which systems and methods for pacing data transmission are implemented according to principles described herein.

Systems and methods for pacing data transmission for a wireless network are described herein. Systems and methods described herein may be configured to determine a pacing rate at which a data stream is transmitted to a user equipment (UE) device. The pacing rate may be determined based on a metric of a radio access network (RAN) to which the UE device is connected. By basing the pacing rate on the RAN metric, the data transmission may be paced at a rate that optimizes utilization of the RAN as well as network resources.

For example, a network may provide a video pacing service, provided by a video pacing server. The video pacing server may receive a data stream that represents a video to be provided to a UE device. The video pacing server may determine a pacing rate for transmitting the video to the UE device, for instance, to provide the video content "just in time." As the UE device streams the video for display to a user, as long as the network provides a next portion of the video before the UE device streams the next portion, the video pacing server may reduce unnecessary bursts on the network without reducing a quality of experience of the user of the UE device.

In a conventional system, the video pacing server may determine the pacing rate based on certain network utilization metrics, such as available bandwidth, peak traffic load, video traffic characteristics, etc. Typically, however, the video pacing server determines the pacing rate based on network utilization metrics of core network components and/or of a certain layer of a protocol stack (e.g., a network layer of a protocol stack). A radio access network (RAN) portion of the network, on the other hand, may be operating on a different layer of the protocol stack (e.g., a data link layer and/or a physical layer) and may have different metrics. In some instances, the RAN metrics may not be correlated with the core network component metrics. As a result, the video pacing server may determine a pacing rate that is configured to optimize for core network utilization, but such a pacing rate may be suboptimal or even counterproductive for RAN utilization.

In one example, the conventional video pacing server may determine a pacing rate that is based on a certain data block (e.g., packet) size that may be efficient for the core network components (e.g., by reducing peak traffic load, etc.). However, the packet size may be smaller than a minimum data block (e.g., transport block) size (e.g., burst size) of the RAN determined by a radio link control (RLC) controller (e.g., scheduler). Consequently, the RAN may add padding data to the data blocks received before transmitting data blocks to the UE device. Such padded data blocks may waste RAN resources as the RAN transmits empty data and also uses more data blocks than needed to transmit the video. Thus, the RAN utilization and/or an overall network utilization may be suboptimal.

In contrast, systems and methods described herein may pace data transmission (e.g., video data transmission) in ways that improve RAN utilization and/or overall network performance. For example, systems and methods described herein may receive RAN metrics and determine and/or adjust the pacing rate for a data stream (e.g., a video stream) based on the RAN metrics. In certain examples, systems and methods described herein may provide a cross-layer solution to determine the pacing rate for a data stream based on RAN metrics (e.g., RAN metrics for the data link layer and/or the physical layer) and other network metrics (e.g., available bandwidth, peak traffic load, data traffic characteristics).

Systems and methods described herein may pace data transmission in one or more ways that improve network performance, such as by lowering the high peak of data traffic, improving RAN utilization, and/or improving the throughput of existing network elements (e.g., eNodeBs over LTE). Systems and methods described herein may provide additional or alternative features and benefits as may serve a particular implementation. Various embodiments will now be described with reference to the figures. The disclosed embodiments may provide one or more of the features and benefits mentioned above and/or various additional and/or alternative features and benefits that will be made apparent herein.

FIG. 1 depicts an illustrative network environment 100 in which systems and methods for pacing data transmission are implemented according to principles described herein. As shown, network environment 100 includes a wireless network 102, a network device 104 of the wireless network 102, and a UE device 106 connected to the wireless network 102 by way of a connection 108 with the network device 104.

Wireless network 102 may include any configuration of network devices that provides a wireless communication network to which appropriately configured UE devices may wirelessly connect and access services provided over wireless network 102. Wireless network 102 may include one or more suitable wireless communication networks, including a mobile network, a cellular network, a wide area network, a fifth generation new radio (5G NR) network, a fourth generation (4G) Long Term Evolution (LTE) network, a 4.5G LTE network, a Voice over IP (VoIP) network, a Voice over LTE (VoLTE) network, a radio frequency (RF) network, a millimeter wave radio network, a high frequency band radio network, any other suitable wireless communication network, and/or any combination thereof.

Network device 104 may include any device or configuration of devices configured to provide features and/or perform operations of wireless network 102. For example, network device 104 may include or be part of a base station, a radio access network (RAN), a base band unit (BBU), a remote radio head (RRH), a NodeB (e.g., an enhanced NodeB or a next generation NodeB) node, one or more radio antennas (e.g., at least one radio antenna array), a user plane function (UPF) node, a session management function (SMF) node, an access management function (AMF) node, a packet gateway (P-GW) node, a serving gateway (S-GW) node, a mobility management entity (MME) node, an O-RAN compliant network device (e.g., an O-RAN compliant radio unit (RU), an O-RAN compliant integrated radio and digital unit (RU/DU), etc.), a data server, any other wireless network element, and/or any suitable combination thereof.

In certain examples, network device 104 is implemented at an edge of wireless network 102 and is configured to perform operations to support wireless communications being transmitted to and received from UE devices connected to and/or attempting to connect to wireless network 102. For example, network device 104 may include a remote radio head (RRH) that transmits and receives radio frequency (RF) signals to/from UE devices such as UE device 106. Such an RRH may include at least one antenna array, transceiver circuitry, and other hardware and software components for enabling the RRHs to receive data via wireless RF signals from UE device 106 and to transmit wireless RF signals to UE device 106.

In certain examples, network device 104 is configured to transmit and receive radio beams that can be emitted in specific directions, such as narrow beams in high frequency bands. For example, network device 104 may be configured to transmit and receive narrow, high frequency band radio beams such as millimeter wave radio beams in frequency bands in the range of 30-300 GHz and/or in the range of 24-30 GHz (e.g., a frequency band from 27.5-28.35 GHz referred to as the 28 GHz band). As another example, network device 104 may be configured to transmit and receive radio beams at suitable mid-band frequencies, which may include mid-band frequencies as may be used for Citizens Broadband Radio Service (CBRS) band (e.g., such as a 3.5 GHz band (e.g., 3550-3700 MHz)) and/or mid-band frequencies in the C-band spectrum. Network device 104 may be configured to perform beam management operations for such radio beams, including beamforming, beam scanning, beam tracking, beam synchronization, and/or one or more other radio beam operations to facilitate radio-beam-based communication with UE device 106. In other examples, any other suitable wireless signals may be transmitted and received by network device 104.

Although FIG. 1 shows a single network device 104, this is for simplicity of illustration and description. Network device 104 may represent one or more network devices of wireless network 102 that are configured to perform one or more of the network-side operations described herein.

UE device 106 may include any device or configuration of devices configured to wirelessly connect to wireless network 102. UE device 106 may include a mobile device, a smartphone, a tablet computer, a laptop computer, an Internet of Things (IoT) device, a vehicle, any suitable computing device, and/or any combination thereof.

In certain examples, UE device 106 is configured to transmit and receive radio beams that can be emitted in specific directions, such as narrow beams in high frequency bands. For example, UE device 106 may be configured to transmit and receive millimeter wave radio beams in high frequency bands within any of the ranges mentioned above. UE device 106 may be configured to perform beam management operations for such radio beams, including beamforming, beam scanning, beam tracking, beam synchronization, and/or one or more other radio beam operations to facilitate radio-beam-based communication with network device 104. In other examples, any other suitable wireless signals may be transmitted and received by UE device 106.

Although FIG. 1 shows a single UE device 106, this is for simplicity of illustration and description. UE device 106 may represent one or more UE devices that are configured to perform one or more of the UE-side operations described herein.

Connection 108 may include any suitable wireless communication connection that supports wireless communications between network device 104 and UE device 106. For example, connection 108 may include RF beams that are transmitted and received by network device 104 and UE device 106 at specific frequencies, in specific directions, and/or during specific time slots. The RF beams may carry signals between network device 104 and UE device 106, and the signals may carry information encoded in the signals. For example, a wireless signal may carry information including but not limited to geographic location information (e.g., information about geographic locations of UE devices), time information, beam signal strengths information (e.g., information about beam signal strengths measured and reported by UE devices), attachment beam information (e.g., information about attachments of UE devices to beams), prioritizations of beams information for beam scanning by UE devices, any other suitable signal information, and/or any combination thereof.

In certain examples, the RF beams are narrow, high-band frequency beams emitted at specific directions. For example, the RF beams may include millimeter wave radio beams in high frequency bands within the ranges mentioned above. Through beam management operations, network device 104 and UE device 106 may select and utilize a specific RF beam or set of RF beams to use for connection 108.

Figure 2:
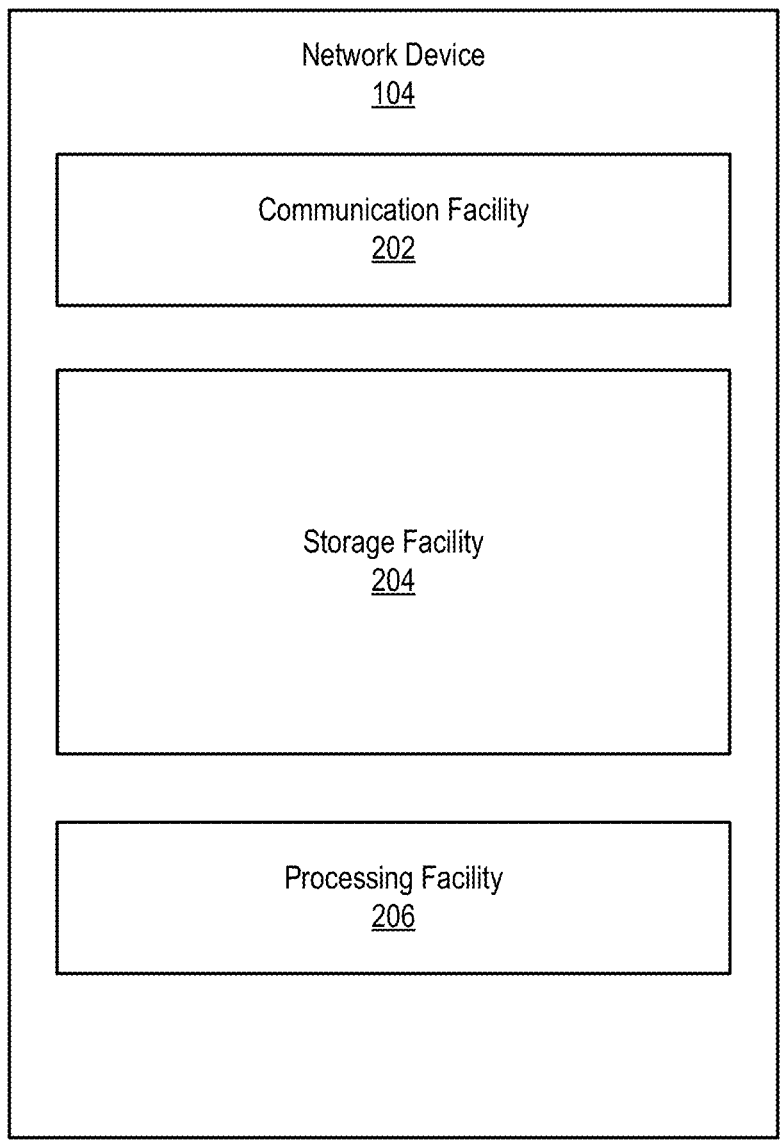
FIG. 2 depicts illustrative components of a network device configured to pace data transmission according to principles described herein.

FIG. 2 depicts illustrative components of network device 104. As shown in FIG. 2, network device 104 may include, without limitation, a communication facility 202, a storage facility 204, and a processing facility 206 selectively and communicatively coupled to one another. Facilities 202-206 may each include or be implemented by one or more physical computing devices including hardware and/or software components such as processors, memories, storage drives, communication interfaces, instructions stored in memory for execution by the processors, and so forth. Although facilities 202-206 are shown to be separate facilities in FIG. 2, facilities 202-206 may be combined into fewer facilities, such as into a single facility, or divided into more facilities as may serve a particular implementation. In some examples, each of facilities 202-206 may be distributed between multiple devices and/or multiple locations as may serve a particular implementation.

Communication facility 202 may communicate with other elements of wireless network 102 and with UE device 106 using any suitable communication technologies. Communication facility 202 may send and receive any suitable wireless signals to/from UE device 106 by way of suitable radio signals (e.g., millimeter wave radio signals). To this end, communication facility 202 may include or be communicatively coupled to one or more antennas (e.g., antennas of at least one antenna array) that are configured to emit radio beams in deterministic directions.

Storage facility 204 may maintain any data received, generated, managed, used, and/or transmitted by processing facility 206. Storage facility 204 may maintain (e.g., store) executable data used by processing facility 206 to perform any of the functionality described herein. For example, storage facility 204 may store instructions that may be executed by processing facility 206 to perform one or more of the operations described herein. The instructions may be implemented by any suitable application, software, code, and/or other executable data instance.

Processing facility 206 may be configured to perform (e.g., execute instructions stored in storage facility 204 to perform) one or more of the network-side operations described herein. For example, processing facility 206 may be configured to determine pacing rates for transmitting data streams to UE 106. Examples of these operations are described in detail herein.

Figure 3:
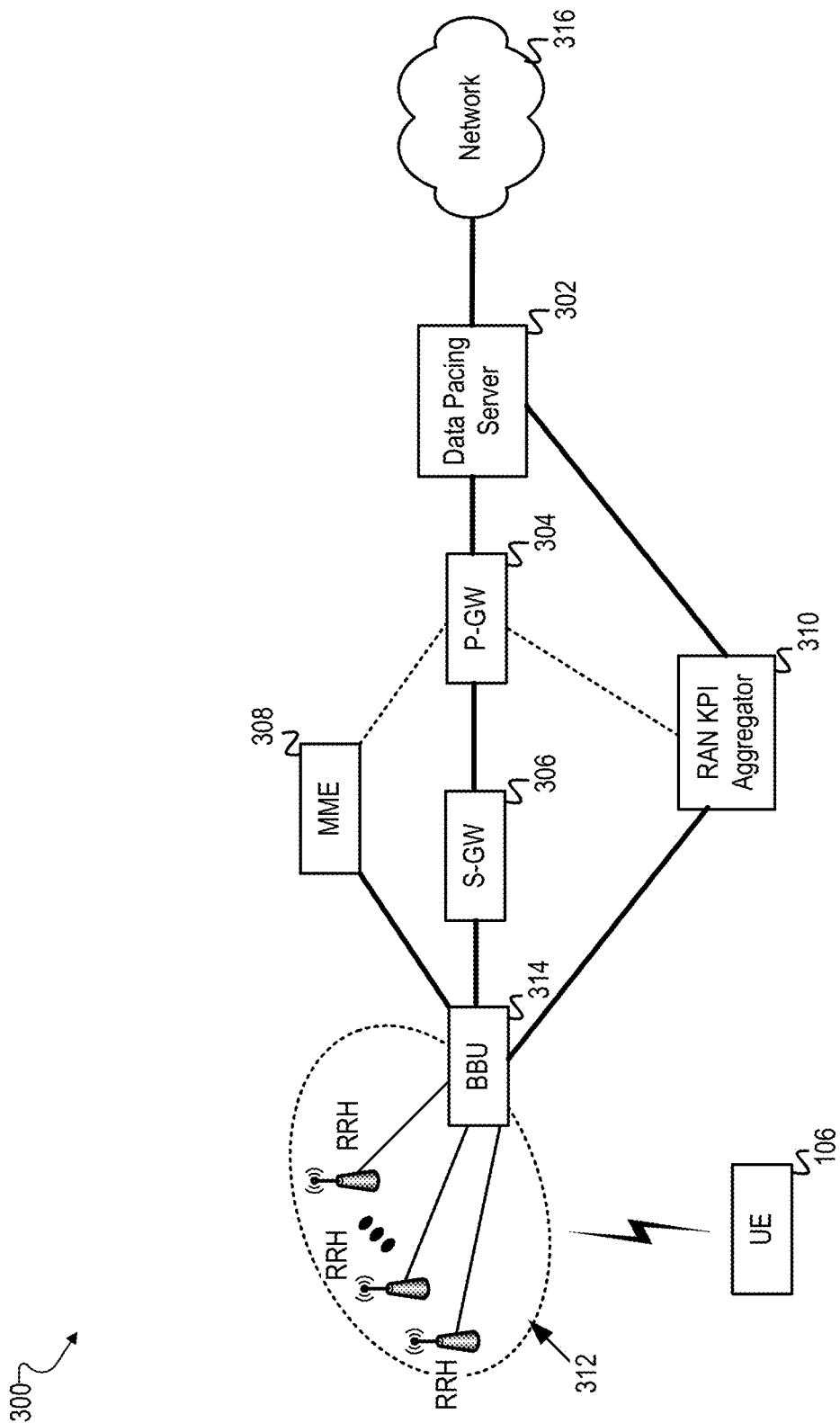
FIG. 3 depicts an illustrative configuration of network devices according to principles described herein.

FIG. 3 depicts an example configuration 300 of a portion of network environment 100 of FIG. 1. Configuration 300 includes a data pacing server 302, a Packet Gateway node (P-GW) 304, a Serving Gateway node (S-GW) 306, a Mobility Management Entity node (MME) 308, and a radio access network (RAN) key performance indicator (KPI) aggregator 310. Configuration 300 further includes a radio access network (RAN) 312 configured to connect to UE 106. The components of network environment 100 not included in RAN 312 (e.g., data pacing server 302, P-GW 304, S-GW 306, MME 308, RAN KPI aggregator 310, and/or any other network devices not shown that are not included in RAN 312) may be part of a core network of network environment 100 and may be referred to as core network components. In other examples not shown, network components such as any of P-GW 304, S-GW 306, MME 308, RAN KPI aggregator 310 may be considered to be part of RAN 312, and other network components (e.g., data pacing server 302) not included in RAN 312 may be referred to as core network components.

Data pacing server 302 may be an implementation of network device 104 that is configured to provide data. For example, data pacing server 302 may be a video pacing server connected to a network 316 and that receives a video stream from network 316 to provide to UE 106. Additionally or alternatively, data pacing server 302 may store a video stream to provide to UE 106. Data pacing server 302 may be configured to pace a transmission of the video stream to UE 106 for efficient use of network resources, as described in detail herein. Additionally or alternatively, data pacing server 302 may provide data so that another network device may provide the video stream to UE 106 at a pace specified by data pacing server 302. The video stream transmission may be paced to conserve or efficiently use resources of network environment 100, such as resources of RAN 312 as well as the core network.

Network 316 may include one or more networks or types of networks capable of carrying communications and/or data signals between devices connected to and/or included in network 316. For example, network 316 may include, but is not limited to, a cable network, an optical fiber network, a hybrid fiber coax network, a wireless network (e.g., a Wi-Fi and/or mobile telephone network), a satellite network, a wireless broadcast network (e.g., a satellite media broadcasting network or terrestrial broadcasting network), a subscriber television network, a provider-specific network, the Internet, an intranet, a local area network, a backhaul network, any other suitable network, and/or any combination or sub-combination of these networks.

Packet Gateway node (P-GW) 304 includes a network device that acts as a router and a gateway between configuration 300 and an external packet data network, and forwards session data between the packet data network and a base band unit in configuration 300. Serving Gateway node (S-GW) 306 includes a network device that routes and forwards session data between P-GW 304 and RAN 312 serving the session's destination UE 106.

Mobility Management Entity (MME) node 308 includes a network device that acts as a control entity for configuration 300, including communicating with a Home Subscriber Server (HSS, not shown in FIG. 3) of network environment 100 for user/device authentication and for user/device profile download. MME node 308 further provides UE 106 with mobility management and session management functions using, for example, Network Access Stratum (NAS) signaling.

RAN 312 may include a base band unit (BBU) 314 and multiple remote radio heads (RRHs). RAN 312 may include one or more additional base band units (BBUs) and RRHs, and other wireless nodes and components, not shown in FIG. 3. BBU 314 may connect to the multiple RRHs via, for example, optical fibers. BBU 314 includes a network device that operates as a digital function unit that transmits digital baseband signals to the multiple RRHs and receives digital baseband signals from the multiple RRHs. If BBU 314 is connected to the multiple RRHs via, for example, optical fibers, then BBU 314 may convert the digital baseband signals into corresponding optical signals for transmission to the RRHs and may receive optical signals from the RRHs and convert the optical signals into corresponding digital baseband signals.

The RRHs include network devices that operate as radio function units that transmit and receive radio frequency (RF) signals to/from UE 106. If the RRHs are connected to BBU 314 via optical fibers, the RRHs may convert received RF signals to optical signals and transmit the optical signals to BBU 314. Additionally, the RRHs may receive optical signals from BBU 314 via the optical fibers and convert the optical signals to RF signals for transmission via one or more antennas (e.g., one or more antenna arrays) of the RRHs. Each of the RRHs may include at least one antenna array, transceiver circuitry, and other hardware and software components for enabling the RRHs to receive data via wireless RF signals from UE 106 and to transmit wireless RF signals to UE 106. If configuration 300 is a 4G LTE network, BBU 314 and an RRH represent a distributed evolved NodeB (eNB).

RAN KPI aggregator 310 includes a network device that receives, determines, and/or stores metrics associated with RAN 312. Such RAN metrics may include statistics of parameters that indicate performance of RAN 312 overall as well as with respect to specific components of RAN 312 and/or with respect to individual UEs (e.g., radio link metrics with respect to UE 106). For instance, RAN metrics may include transport block utilization, transport block size, physical resource block utilization, resource block availability, channel quality indicator, radio link resource utilization, and any other suitable parameters.

RAN KPI aggregator 310 may be communicatively coupled to and/or implemented by any of BBU 314 and data pacing server 302, as well as P-GW 304. RAN KPI aggregator 310 may receive RAN metrics from BBU 314 and/or P-GW 304 and may provide the RAN metrics to data pacing server 302. Data pacing server 302 may access (e.g., receive, retrieve, generate, etc.) RAN metrics data from RAN KPI aggregator 310 and use the RAN metrics data to determine and/or adjust the pacing rate of transmission of the video stream to UE 106.

Without the RAN metrics data, the pacing rate determined by data pacing server 302 may be based on core network metrics of network environment 100, such as bandwidth availability, traffic load, and other such metrics. However, efficiencies gained by setting a pacing rate based on core network metrics may be offset by properties of RAN 312. For instance, a pacing rate determined by optimizing for core network metrics may be based on a certain data block size. However, the determined data block size may conflict with a minimum transport block size based on current conditions for RAN 312, resulting in padding of transport blocks and wasting resources of RAN 312.

Thus, data pacing server 302 may access RAN metrics data from RAN KPI aggregator 310 and determine the pacing rate based on the RAN metrics data (as well as core network metrics data, in some examples) to improve resource utilization for RAN 312. For example, data pacing server 302 may pace the data transmission using any suitable algorithm, such as a token bucket algorithm. The token bucket algorithm may include a token size and a token interval. For instance, the pacing rate may be determined by the token size divided by the token interval. Data pacing server 302 may determine the token size based on a transport block size for UE 106 on RAN 312. For instance, data pacing server 302 may periodically compare a current token size with a current transport block size based on RAN metrics received from RAN KPI aggregator 310. If the current token size is smaller than the current transport block size, data pacing server 302 may update the token size based on the current transport block size (e.g., setting the token size to equal the current transport block size). Data pacing server 302 may further update the token interval based on the updated token size to adjust the pacing rate (e.g., set an updated pacing rate) for transmitting the video stream. For example, the token interval may be set to equal a product of the updated token size multiplied by the current token interval, divided by the current token size.

As data pacing server 302 may access RAN metrics at any suitable frequency, the pacing rate may be frequently, periodically, and/or continuously optimized as characteristics of RAN 312 and/or characteristics of a radio link between RAN 312 and UE 106 change, reflected in changing RAN metrics. For instance, RAN metrics may be updated by RAN KPI aggregator 310 every 15 minutes and provided to data pacing server 302 for updating the pacing rate. In other examples, any other suitable frequency (e.g., every 10 minutes, 5 minutes, every minute, real time, a fluctuating frequency based on a rate of change in the RAN metrics, etc.) may be used for updating RAN metrics.

In some examples, an initial token size and/or token interval may be determined based on core network metrics. The initial token size may then be compared to the transport block size based on RAN metrics and updated to the transport block size if the transport block size is larger than the initial token size. As UE 106 may include a playout buffer for the video stream, token sizes, token intervals, and/or pacing rates may be adjusted while maintaining a quality of experience for a user of UE 106.

As another example, data pacing server 302 may access RAN metrics such as a call quality indicator (CQI), a transmission time interval (TTI), and/or an estimation of a number of available resource blocks of RAN 312 associated with UE 106. Based on such metrics, data pacing server 302 may determine the transport block size for UE 106 on RAN 312. Based on the determined transport block size, data pacing server 302 may determine the pacing rate. Additionally or alternatively, the pacing rate may be based on any other suitable metrics of RAN 312 and/or any metrics derived from metrics of RAN 312.

FIG. 3 illustrates a single example implementation of a configuration of components of network environment 100. Other components and configurations of network environment 100 may, however, be implemented. Therefore, configuration 300 may include additional, fewer, and/or different components that may be configured differently than depicted in FIG. 3 and described herein. For example, though a single base band unit BBU 314 is shown as a component of RAN 312, RAN 312 may include multiple base band units, with each of the multiple base band units further connecting to at least one RRH. As another example, while configuration 300 depicts data pacing server 302 as a separate network device, data pacing server 302 may be implemented as part of one or more other network devices (e.g., P-GW 304, S-GW 306, etc.). Further, while configuration 300 depicts an example implementation of a configuration of the components of one example type of network (e.g., an LTE network), systems and methods described herein may be implemented on any suitable network with any suitable configuration of network components.

Figure 4:
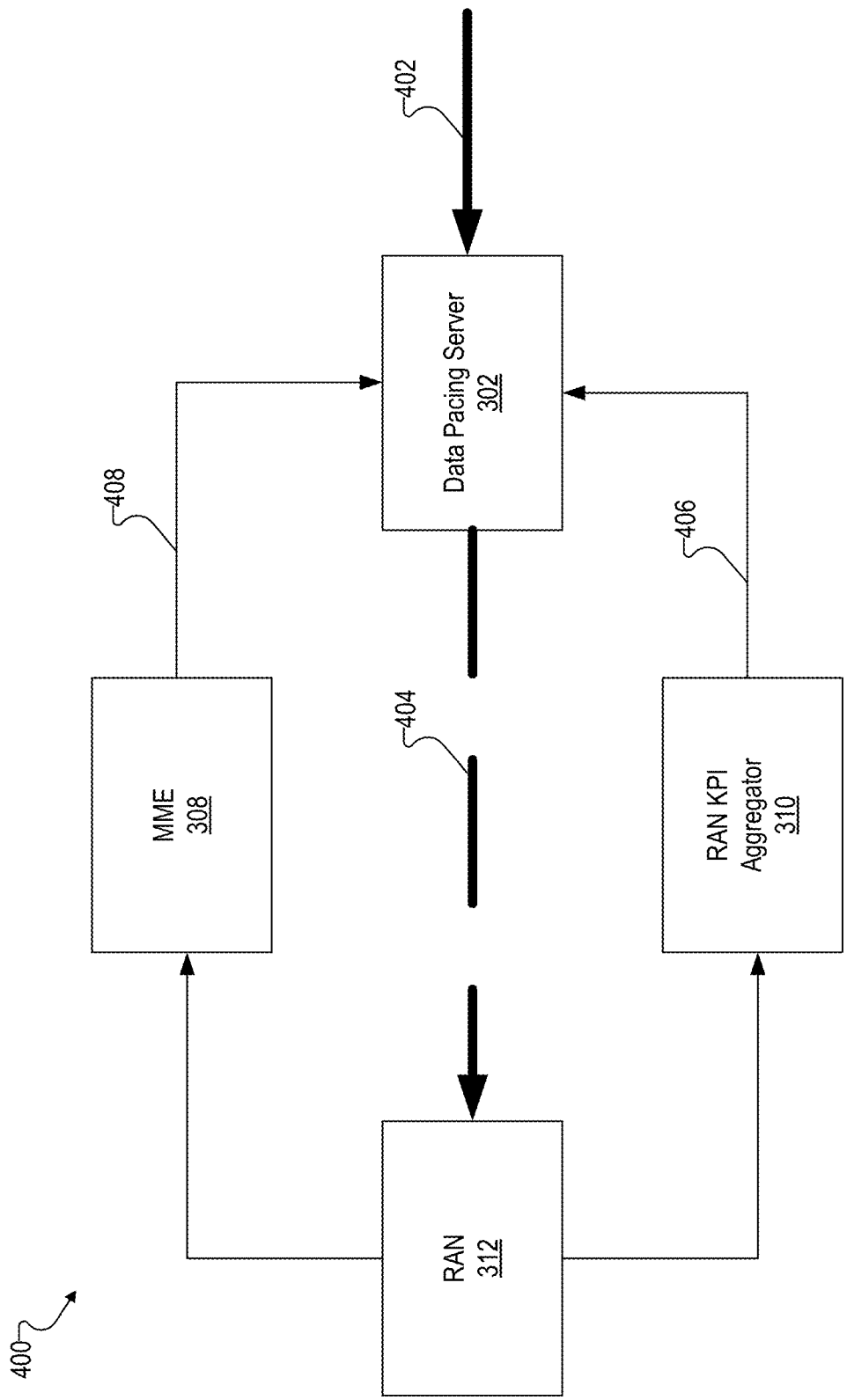
FIG. 4 depicts an illustrative flow of data between network devices according to principles described herein.

FIG. 4 illustrates an example data flow diagram 400 between network devices of configuration 300. Diagram 400 shows data pacing server 302 receiving a data (e.g., video) stream 402 to provide to a UE (e.g., UE 106). Data pacing server 302 determines a pacing rate for transmitting data stream 402 to UE 106 and transmits a paced data stream 404 to RAN 312. As described, data pacing server 302 may access RAN metrics data 406 from another network device (e.g., RAN KPI aggregator 310). RAN metrics data 406 may include metrics of RAN 312 such as CQI, resource block availability, estimated resource block availability, transport block size, radio link utilization, etc. RAN metrics data 406 may further include data associated with the RAN metrics such as timestamps, UE identifiers (e.g., an international mobile equipment identity (IMEI), a mobile device number (MDN), etc.), etc. Such data may enable data pacing server 302 to process the RAN metrics to determine RAN metrics specific to UE 106.

Data pacing server 302 may also access UE data 408 from another network device (e.g., MME 308). UE data 408 may include data associated with UE 106, such as timestamps, UE identifiers, internet protocol (IP) addresses, RAN identifiers for RANs connected to UE 106, etc. UE data 408 may enable data pacing server 302 to match an IP address of UE 106 with an identifier of UE 106, which may allow data pacing server 302 to determine which of RAN metrics data 406 to use in determining the pacing rate for transmitting data stream 402 to UE 106. UE data 408 may further include user profile data associated with UE 106, such as subscription information, service information, billing information, etc. Data pacing server 302 may use such user profile data to determine parameters of pacing the data transmission. For instance, data transmission pacing may be a service for which a user may subscribe. In such a case, data pacing server 302 may determine whether the user of UE 106 is subscribed to the data transmission pacing service and pace the transmission if the user is subscribed and refrain from pacing the transmission (or pace the transmission at a maximum pacing rate) if the user is not subscribed. Such subscriptions may depend on a data type of the data stream, such as video, music, etc. As another example, a user may have a monthly data limit, after which data transmitted to UE 106 is paced at a low rate (e.g., throttled). Data pacing server 302 may access the user profile data to determine whether the user has met or exceeded the monthly data limit and determine the pacing rate based on such data.

Figure 5:
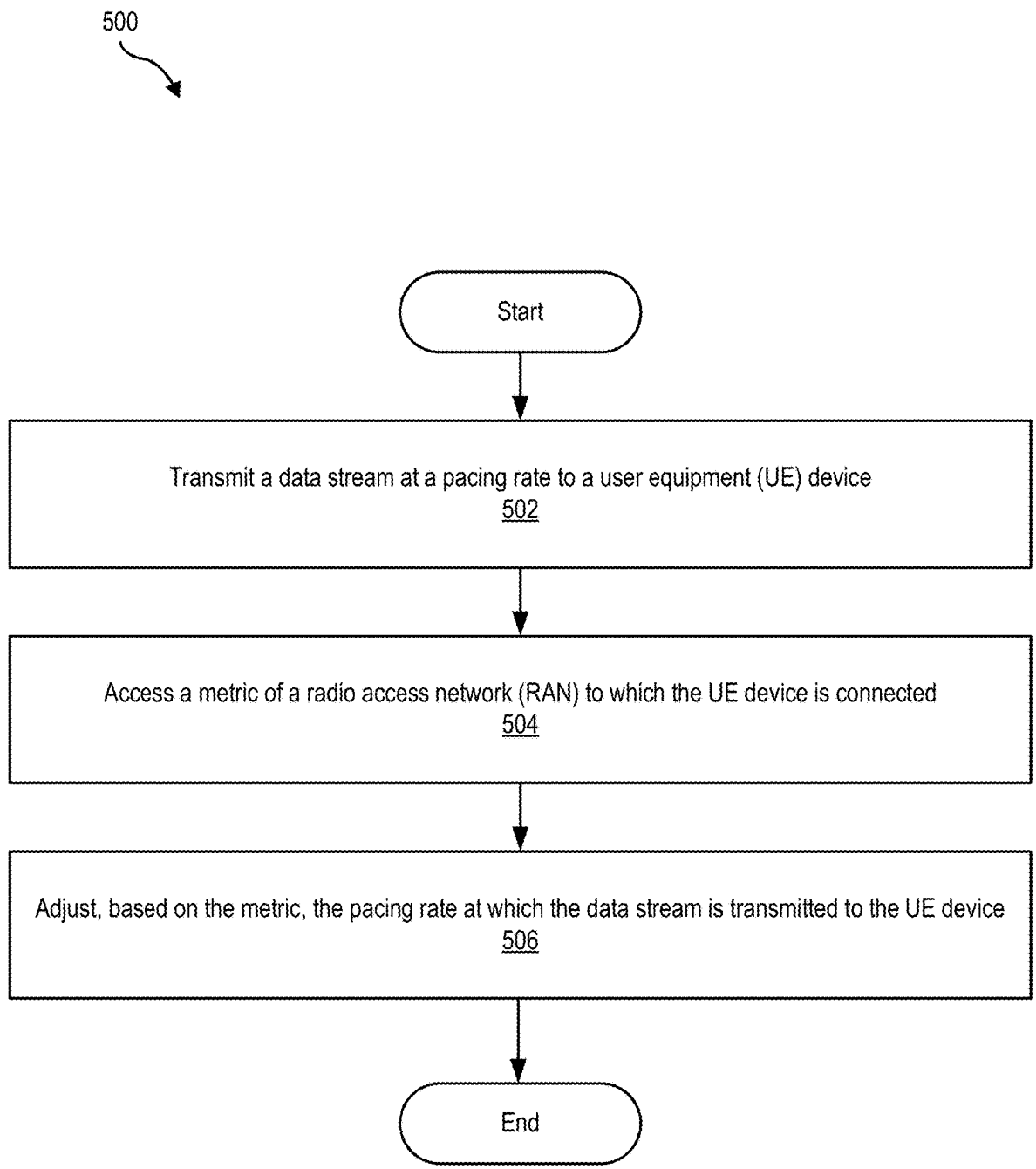
FIG. 5-6 depict illustrative methods according to principles described herein.

FIG. 5 illustrates an example method 500. While FIG. 5 illustrates example operations according to one embodiment, other embodiments may omit, add to, reorder, combine, and/or modify any of the operations shown in FIG. 5. One or more of the operations shown in FIG. 5 may be performed by a network device (e.g., data pacing server 302) and/or any implementation thereof.

In operation 502, a network device transmits a data stream at a pacing rate to a user equipment (UE) device. Operation 502 may be performed in any of the ways described herein.

In operation 504, the network device accesses a metric of a radio access network (RAN) to which the UE device is connected. In some examples, the metric may be associated with the UE device (e.g., may include a metric for a link connecting the UE device and the RAN). Operation 504 may be performed in any of the ways described herein.

In operation 506, the network device adjusts, based on the metric, the pacing rate at which the data stream is transmitted to the UE device. Operation 506 may be performed in any of the ways described herein.

Figure 6:
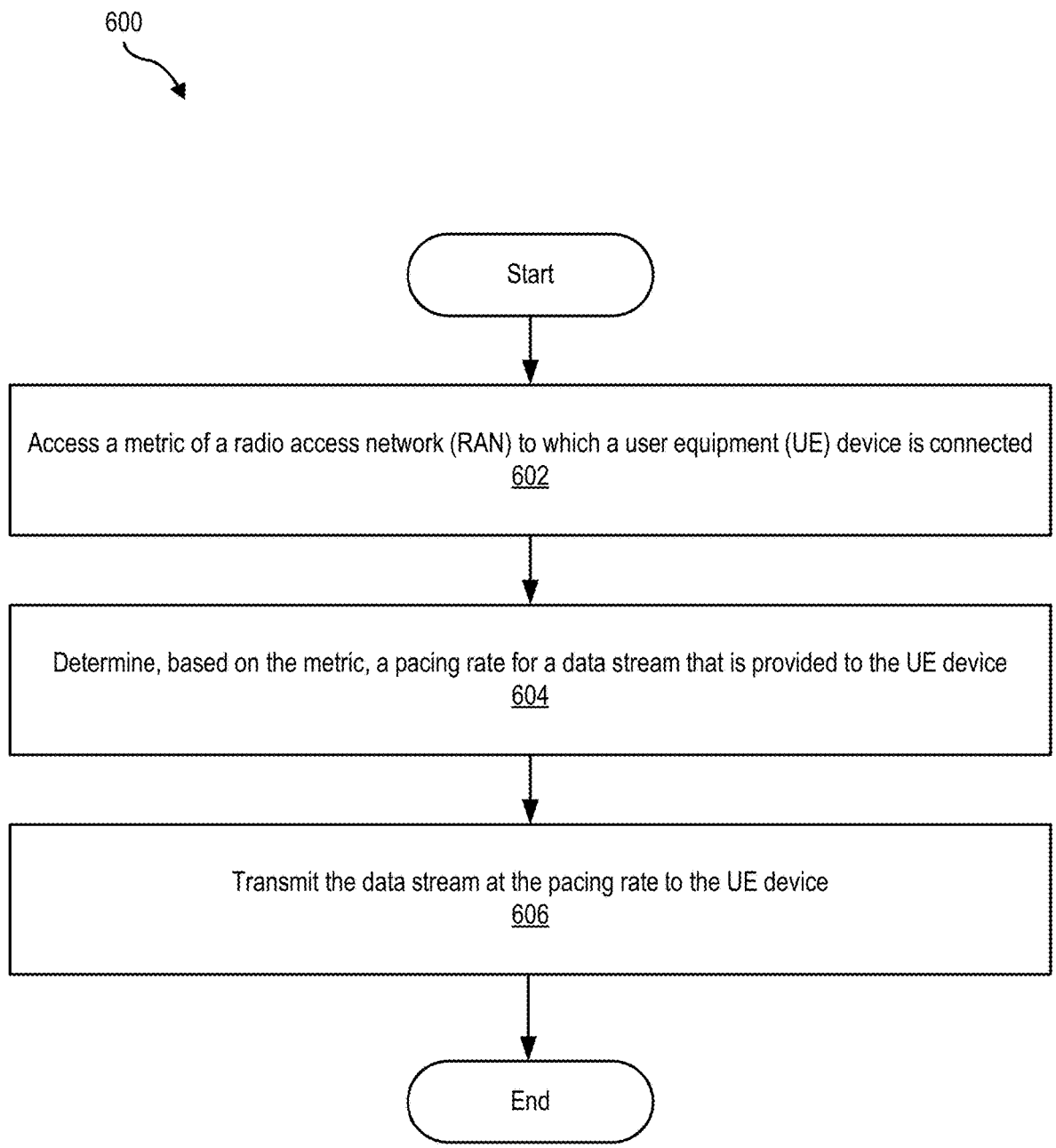

FIG. 6 illustrates another example method 600. While FIG. 6 illustrates example operations according to one embodiment, other embodiments may omit, add to, reorder, combine, and/or modify any of the operations shown in FIG. 6. One or more of the operations shown in FIG. 6 may be performed by a network device (e.g., data pacing server 302) and/or any implementation thereof.

In operation 602, a network device accesses a metric of a radio access network (RAN) to which a user equipment (UE) device is connected. In some examples, the metric may be associated with the UE device (e.g., may include a metric for a link connecting the UE device and the RAN). Operation 602 may be performed in any of the ways described herein.

In operation 604, the network device determines, based on the metric, a pacing rate for a data stream that is provided to the UE device. Operation 604 may be performed in any of the ways described herein.

In operation 606, the network device transmits the data stream at the pacing rate to the UE device. Operation 606 may be performed in any of the ways described herein.

In certain embodiments, one or more of the systems, components, and/or processes described herein may be implemented and/or performed by one or more appropriately configured computing systems or devices. To this end, one or more of the systems and/or components described above may include or be implemented by any computer hardware and/or computer-implemented instructions (e.g., software) embodied on at least one non-transitory computer-readable medium configured to perform one or more of the processes described herein. In particular, system components may be implemented on one physical computing system or device or may be implemented on more than one physical computing system or device. Accordingly, system components may include any number of computing systems and devices, and may employ any of a number of computer operating systems.

In certain embodiments, one or more of the processes described herein may be implemented at least in part as instructions embodied in a non-transitory computer-readable medium and executable by one or more computing systems. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a compact disc read-only memory ("CD-ROM"), a digital video disc ("DVD"), any other optical medium, random access memory ("RAM"), programmable read-only memory ("PROM"), electrically erasable programmable read-only memory ("EPROM"), FLASH-EEPROM, any other memory chip or cartridge, or any other tangible medium from which a computer can read.

Figure 7:
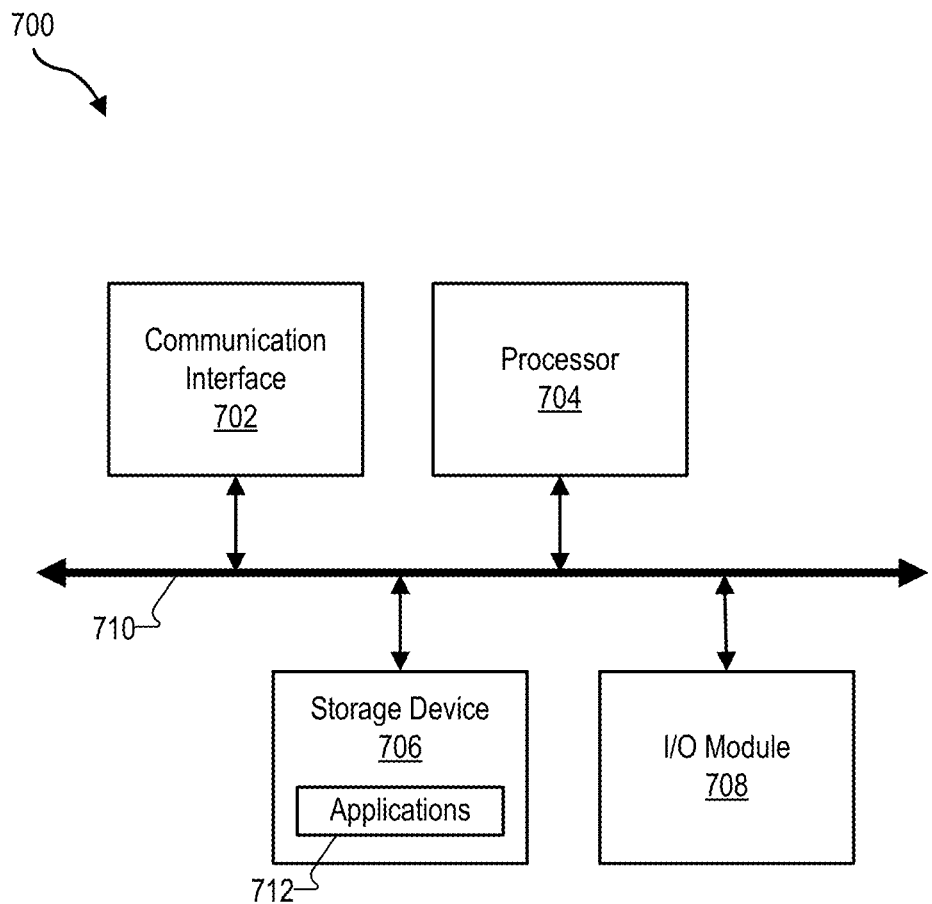
FIG. 7 depicts an illustrative computing device according to principles described herein.

FIG. 7 illustrates an exemplary computing system 700 that may be specifically configured to perform one or more of the processes described herein. For example, computing system 700 may implement a network device 104 (e.g., data pacing server 302), or any other computing systems or devices described herein.

As shown in FIG. 7, computing system 700 may represent any computing system or device that includes components such as a communication interface 702, a processor 704, a storage device 706, and an input/output ("I/O") module 708 communicatively connected via a communication infrastructure 710. While an exemplary computing system 700 is shown in FIG. 7, the components illustrated in FIG. 7 are not intended to be limiting. Additional or alternative components may be used in other embodiments. Components of computing system 700 shown in FIG. 7 will now be described in additional detail.

Communication interface 702 may be configured to communicate with one or more computing systems and/or devices. Examples of communication interface 702 include, without limitation, a wired network interface (such as a network interface card), a wireless network interface (such as a wireless network interface card), a modem, an audio/video connection, and any other suitable interface.

Processor 704 generally represents any type or form of processing unit capable of processing data or interpreting, executing, and/or directing execution of one or more of the instructions, processes, and/or operations described herein. Processor 704 may direct execution of operations in accordance with one or more applications 712 or other computer-executable instructions such as may be stored in storage device 706 or another computer-readable medium.

Storage device 706 may include one or more data storage media, devices, or configurations and may employ any type, form, and combination of data storage media and/or device. For example, storage device 706 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 706. For example, data representative of one or more executable applications 712 configured to direct processor 704 to perform any of the operations described herein may be stored within storage device 706. In some examples, data may be arranged in one or more databases residing within storage device 706.

I/O module 708 may include one or more I/O modules configured to receive user input and provide user output. One or more I/O modules may be used to receive input for a single virtual experience. I/O module 708 may include any hardware, firmware, software, or combination thereof supportive of input and output capabilities. For example, I/O module 708 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 708 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 708 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing system 700. For example, one or more applications 712 residing within storage device 706 may be configured to direct processor 704 to perform one or more processes or functions associated with communication facility 202 and/or processing facility 206 of system 200. Likewise, storage facility 204 of system 300 may be implemented by or within storage device 706.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
   accessing, by a network device, a metric of a radio access network (RAN) to which a user equipment (UE) device is connected, the metric comprising a transport block size of the UE device;
   comparing, by the network device, the transport block size with a token size that defines a size of each token associated with a pacing rate of a data stream transmission to the UE device;
   adjusting, by the network device, the token size to an updated token size based on the transport block size if the token size is smaller than the transport block size; and
   providing, by the network device, the token size for transmitting, based on the pacing rate, a data stream to the UE device.

2. The method of claim 1, wherein:
   the pacing rate is based on the token size and a token interval; and
   the method further comprises adjusting the token interval based on the token size and the updated token size.

3. The method of claim 1, wherein the providing the token size comprises providing the pacing rate.

4. The method of claim 1, wherein the providing the token size comprises providing the token size to another network device.

5. The method of claim 1, wherein:
   the metric of the RAN further comprises a channel quality indicator (CQI) and a transmission time interval (TTI); and
   the adjusting the token size comprises determining the transport block size based on the CQI and the TTI.

6. The method of claim 1, further comprising accessing, by the network device from a first other network device, an identifier for the UE device; and
   wherein the accessing the metric of the RAN associated with the UE device comprises accessing, from a second other network device, the metric based on the identifier.

7. The method of claim 6, further comprising accessing, by the network device from the first other network device, profile data associated with the UE device; and
   wherein the pacing rate is based on the profile data.

8. The method of claim 1, wherein the data stream comprises a video data stream.

9. A method comprising:
   accessing, by a network device, a metric of a radio access network (RAN) to which a user equipment (UE) device is connected, the metric comprising a transport block size for the UE device;
   determining, by the network device and based on the metric, a pacing rate for a data stream that is transmitted to the UE device, the pacing rate based on a token size that defines a size of each token and a token interval, the determining the pacing rate comprising:
   comparing the token size with the transport block size; and
   setting the token size to an updated token size based on the transport block size if the token size is smaller than the transport block size; and providing, by the network device, the pacing rate for transmitting, based on the pacing rate, the data stream to the UE device.

10. The method of claim 9, wherein the pacing rate is based on a token bucket algorithm using the token size and the token interval.

11. The method of claim 9, wherein the determining the pacing rate further comprises setting the token interval based on the token size and the updated token size.

12. The method of claim 9, wherein:
the metric of the RAN further comprises a channel quality indicator (CQI) and a transmission time interval (TTI); and
the transport block size is based on the CQI and the TTI.

13. The method of claim 9, further comprising accessing, by the network device from a first other network device, an identifier for the UE device; and
wherein the accessing the metric of the RAN comprises accessing, from a second other network device, the metric based on the identifier.

14. The method of claim 13, further comprising accessing, by the network device from the first other network device, profile data associated with the UE device; and
wherein the pacing rate is based on the profile data.

15. The method of claim 9, wherein the data stream comprises a video data stream.

16. A system comprising:
a memory storing instructions;
a processor communicatively coupled to the memory and configured to execute the instructions to:
access a metric of a radio access network (RAN) to which a user equipment (UE) device is connected, the metric comprising a transport block size for the UE device;
determine, based on the metric, a token size for a pacing rate for a data stream that is transmitted to the UE device, the token size defining a size of each token, the determining the token size comprising:
comparing the token size with the transport block size; and
setting the token size to an updated token size based on the transport block size if the token size is smaller than the transport block size; and
provide the token size for transmitting the data stream at the pacing rate to the UE device.

17. The system of claim 16, wherein the pacing rate is based on a token bucket algorithm using the token size and a token interval.

18. The system of claim 16, wherein:
the metric of the RAN further comprises a channel quality indicator (CQI) and a transmission time interval (TTI); and
the method further comprises determining the pacing rate by:
determining the transport block size based on the CQI and the TTI; and
setting the token interval based on the token size and the updated token size.

19. The system of claim 16, wherein:
the processor is further configured to execute the instructions to access, from a first other network device, an identifier for the UE device; and
the accessing the metric of the RAN associated with the UE device comprises accessing, from a second other network device, the metric based on the identifier.

20. The system of claim 19, wherein:
the processor is further configured to execute the instructions to access, from the first other network device, profile data associated with the UE device; and
the token size is based on the profile data.

* * * * *